April 3, 1962     A. J. HARDER, JR     3,027,753
LEAK DETECTION DEVICE
Filed April 29, 1960     2 Sheets-Sheet 2
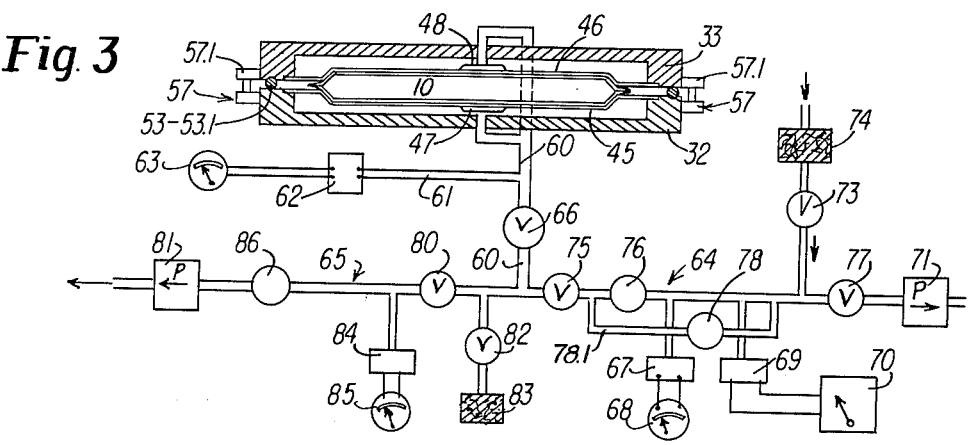
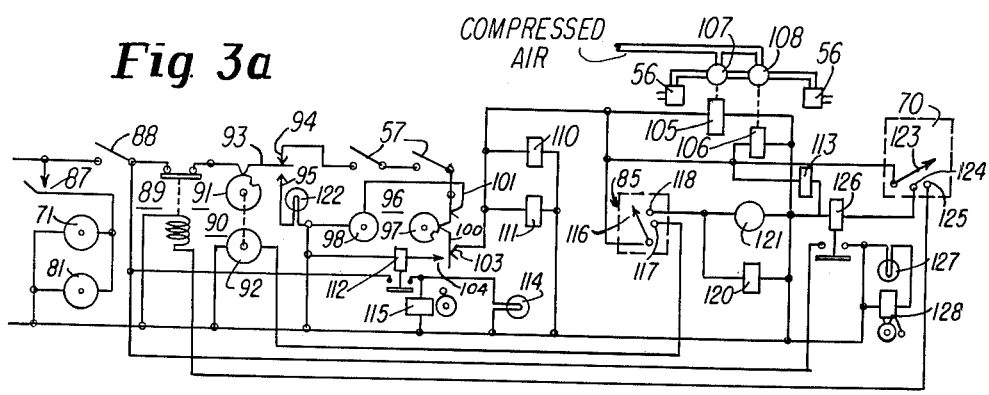
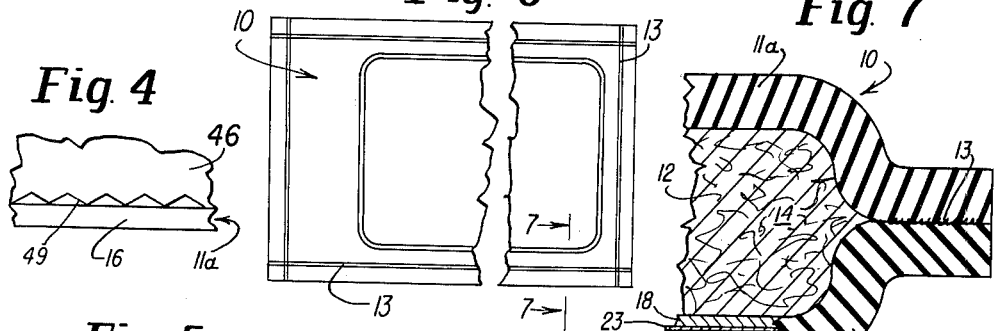
INVENTOR.
Arthur J. Harder Jr.
BY Marvin M. Chaban
Atty.

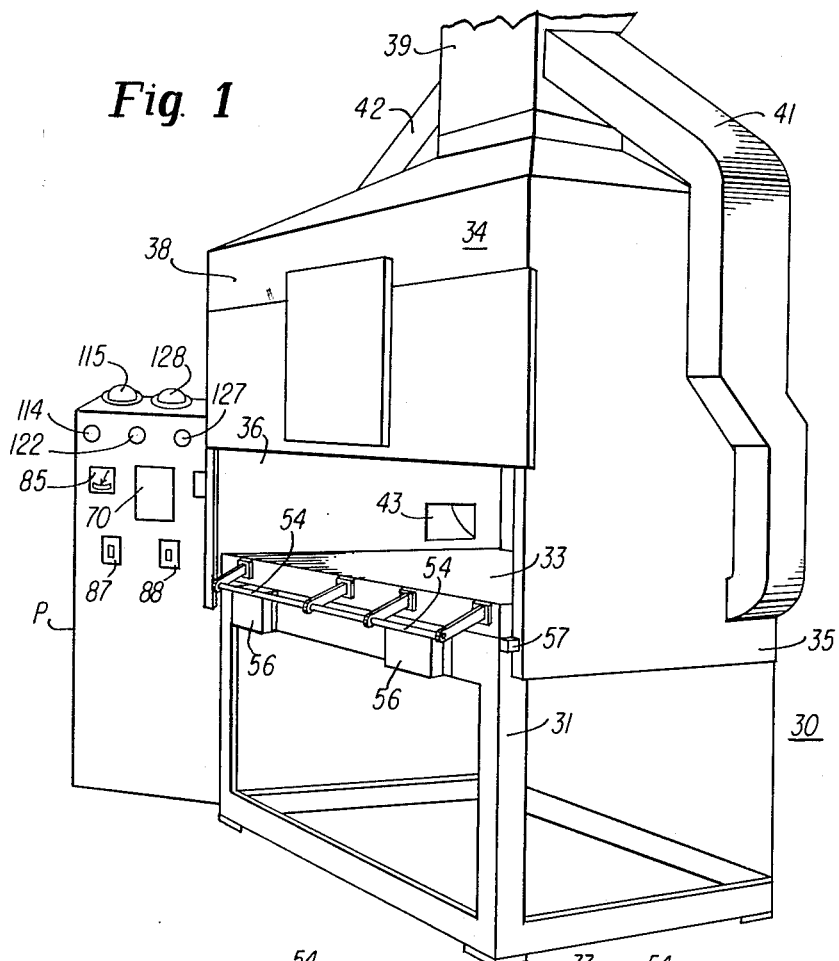
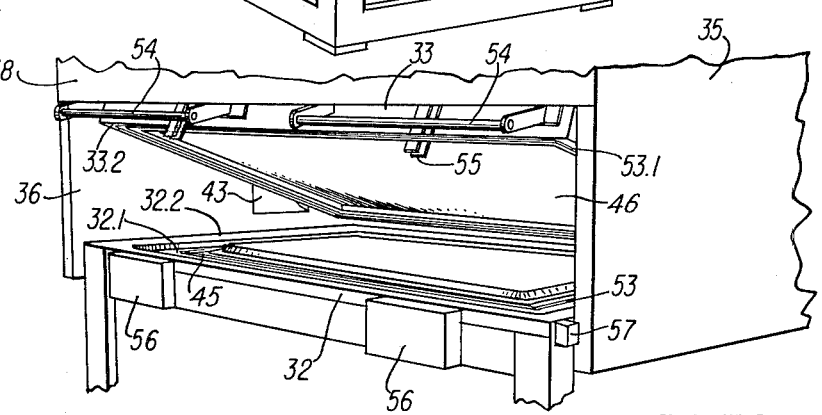

United States Patent Office 3,027,753
Patented Apr. 3, 1962

3,027,753
LEAK DETECTION DEVICE
Arthur J. Harder, Jr., Franklin Park, Ill., assignor to General Electric Company, a corporation of New York
Filed Apr. 29, 1960, Ser. No. 25,676
13 Claims. (Cl. 73—40.7)

This invention relates to testing devices and more particularly to devices for testing to detect minute leaks in enclosed, sealed units.

This invention has as its object to provide an apparatus for detecting leaks of any magnitude in a thermal insulation unit in which a charge of gas is contained within a hermetically sealed, flexible, envelope of gas-impervious material.

A further object of the invention is to provide an apparatus for sequentially testing flexible walled sealed units of divergent sizes with no change in setup of the machine required.

It is a further object to provide a resilient walled testing chamber which will closely conform to the shape of the flexible walled unit under test to reinforce the unit walls during the test.

A still further object of the invention resides in the construction of a resilient walled testing chamber which will closely conform to the outer contours of the object under test to support the object against rupture by internal pressures and yet will allow even minute amounts of leakage gas to reach the leak-detection apparatus.

The apparatus described herein has been designed to test the efficacy of the filling and sealing operations as applied to flexible paper and plastic laminated bags of the type used as heat insulating units. A typical unit of the type to be tested in my machine is shown in co-pending application Number 688,977 by T. S. Simms and A. J. Harder, Jr. filed October 8, 1957, now U.S. Patent 3,004,877 issued October 17, 1961 and assigned to the present assignee. Each such unit includes a hermetically sealed bag enclosing both a porous mass of solid poor heat-conducting material and a charge of gas having a coefficient of thermal conductivity lower than that of air and thoroughly permeating the porous mass of material. The bag may be constructed of a flexible multi-ply laminate provided with an intermediate ply of kraft paper having a high tear strength, an inner ply of organic resin having a low permeability and an outer ply or organic resin having a high abrasion resistance, whereupon the insulation unit comprises a pillow-like object having gas impervious, flexible sidewalls, the seams of which are heat-sealed to prevent the escape of the confined gas or the ingress of atmospheric gases. In order to insure that the unit retain its excellent heat insulating characteristics, the seal must remain air tight for the intended life of the insulation unit which is considered to be from fifteen to twenty years. Immediately after manufacture, therefore, the completed unit is subjected to meticulous testing, not only for absolute tightness of the seal, but also for breaks or minute leakage points in the laminate itself.

To provide the required degree of testing of the flexible pillow-like sealed insulation unit, the present apparatus consists of a device having a rigid outer support frame and a resilient inner, evacuable chamber. The sealed bag is placed within the inner chamber and the outer frame is then closed; the inner chamber then forms an envelope about the bag. The envelope is evacuated so that the envelope may deform to closely conform in shape to the contours of the sealed bag thereby supporting the flexible bag walls during the testing operation. When a sufficient vacuum is attained in the inner chamber envelope, a leak detection apparatus is activated to sense the presence or absence of gas leaking from the bag into the inner chamber. On the presence of such a leak, a signaling device so indicates.

My invention, both as to organization and method of operation, together with further objects and advantages thereof, may best be understood by reference to the following description taken in connection with the accompanying drawings of which:

FIG. 1 is a perspective view of the exterior of the machine for carrying out my invention;

FIG. 2 is a partial perspective view of the inner chamber of the machine of FIG. 1;

FIG. 3 is a schematic diagram of the mechanism of the machine of FIG. 1;

FIG. 3a is a schematic wiring diagram for the machine;

FIG. 4 is a highly enlarged partial cross-section of the diaphragm of the inner chamber of FIG. 2;

FIG. 5 is a highly enlarged partial plan view of the internal surface of the diaphragm of FIG. 2;

FIG. 6 is a reduced plan view of one of the gas-filled sealed, insulating units to be tested in the machine of FIG. 1; and FIG. 7 is an enlarged partial sectional view of the insulating unit, taken in vertical section, and schematically showing in one portion thereof the composition of the laminated wall of the insulation unit.

Referring first to FIGS. 6-7, inclusive, of the drawing, the heat-insulating unit 10, there illustrated is of substantially pillow-like form and of substantially rectangular configuration; the unit 10 comprising a pair of complementary sheets 11a and 11b disposed on opposite sides of a slab or mattress 12 of heat-insulating material; which sheets 11a and 11b are drawn down around the mattress 12 and sealed about the meeting marginal edges thereof, as indicated at seal 13 thereby to define an hermetically sealed bag enclosing the mattress 12. Also the bag of the unit 10 comprises a charge (indicated by the reference character 14) of gas occupying the bag and thoroughly permeating the porous mass of the mattress 12. The gas is selected from those having a substantially lower thermal conductivity than that of air. Accordingly, the hermetically sealed envelope or bag of the unit 10 comprises the two complementary sections of substantially rectangular dish-like configuration and including the pair of opposed facing walls respectively defined by the pair of sections and the connecting marginal wall jointly defined by the pair of sections.

Preferably the sheets 11a and 11b are identical, each comprising a flexible sheet-like wall formed of low thermal conductivity materials and constituting a unitary multi-ply laminate. Specifically, as shown in FIG. 7, the sheet 11a may comprise an intermediate ply 15 of kraft paper having a high tear strength, an outer ply 16 of organic resin having a high abrasion resistance, and two inner plies 17 and 18 of organic resin having a low permeability to gas and air and water vapor. In the laminate 11a, the outer ply 16 is intimately bonded to the intermediate ply 15 by a layer of adhesive 21, the inner ply 17 is intimately bonded to the intermediate ply 15 by a layer of adhesive 22 and the inner ply 18 is intimately bonded to the inner ply 17 by a layer of adhesive 23.

In the unit 10, the mattress 12 may be formed of any of a number of suitable heat-insulating materials, but it preferably comprises a mass or slab of loosely packed glass fibers, the fibers being suitably matted to render the bat or mattress 12 sufficiently self-supporting and integrated to accommodate ready handling thereof. Likewise the charge 14 of gas may be selected from a number of heavy-molecule gases having a thermal conductivity lower than that of air, but preferably it essentially comprises dichlorodifluoromethane ("Freon–F12"), as this material possesses a number of characteristics favorable to its use for heat insulation.

The unit 10 as shown in FIGS. 6 and 7 is substantially rectangular in plan and may be fabricated in a number of sizes including divergent length, and width dimensions. When the charge 14 of $CCl_2F_2$ is introduced into the bag of unit 10, it has a pressure of about 700 mm. of mercury at a temperature of about 120° F. so that there is a slight sub-atmospheric pressure of the charge 14 of the gas enclosed in the bag; whereby the facing walls of the bag are normally pressed by atmospheric pressure into firm engagement with the adjacent faces of the slab or mattress 12. The mattress 12 fully occupies the bag, except for a space a few inches from one end thereof, so as to provide a normally collapsed expansion pocket, at the left-hand end of the bag (not shown). This normally collapsed expansion pocket, together with the normal elasticity of the walls of the bag, accommodate the expansion of the confined charge 14 of gas so that the pressure within the bag at the upper end of the normal operating temperature range thereof (−22.6° F. to 150° F.) does not substantially exceed atmospheric pressure. Accordingly internal pressure of the unit 10 is at all times within safe limits in the normal operating temperature range thereof and normal atmospheric pressure, whereby if the bag were subjected to high ambient temperatures and an atmospheric pressure typical of the altitude of Denver, Colorado, for example, it would not rupture or puncture.

The composite structure of the laminate 11a is very advantageous in that the kraft paper ply 15 lends great tear strength thereto, while outer ply 16 of organic plastic provides abrasion resistance and the inner plies 17 and 18 of organic plastic lend low permeability thereto with respect to the gases involved. More particularly, the composite laminate 11a is practically impervious to the charge 14 of $CCl_2F_2$ confined in the hermetically sealed bag and highly impervious to ordinary light atmospheric gases, including water vapor. Furthermore, the inner plies 17 and 18 are of the vinylidene chloride polymer known as "Saran," which is admirably suited to heat-sealing in the manufacture of the unit 10. In manufacturing unit 10, the marginal edges along the sides and one end of the two sheets 11a and 11b are subjected to heat and pressure therethrough, so that the inner plies 17 and 18 of the two sheets in facing relation with each other, fuse and bond together, producing a sealed bag open at one end. The mattress 12 is inserted through the open end, and the bag placed in apparatus which exhausts the air from the bag and mattress, introduces the necessary charge of gas, and completes the heat-sealing of the bag. In the heat-sealing operation, the paper plies 15 of the two sheets absorb with their resilient thickness any variation in the thickness of the Saran plies 17 and 18 in the two sheets, as well as other sources of misalignment, thereby eliminating microscopic bridges through the welds and unfused areas in the welds. More particularly, these paper plies effect a more uniform pressure along the entire length of the seam in fusing the liquid interfaces. Moreover, these paper plies distribute some of the force of the sealing electrodes laterally, so that the plastic material adjacent to the weld zone is compressed, thereby preventing excessive upsetting of the plastic material. This materially improves the tear resistance of the plastic material adjacent to the weld and prevents any reduction in thickness through which excessive permeation might occur. Hence, the important structural advantages of the bag of the unit 10 flow not only from the individual elements or plies of the sheets thereof, but also from the cooperation therebetween and from the essentially new characteristics imparted to the plastic plies by the paper plies, both in the final structure of the bag and in the fabrication thereof.

Turning now to FIGS. 1 and 2, there is shown a testing machine 30 embodying the present invention. It comprises a rectangular frame 31 serving as a base for supporting the machine on the floor. Frame 31 at its upper extremity terminates in a metallic table top structure or stationary bed 32 having a working area 32.1 horizontally depressed relative to its marginal rim 32.2. Hinged to bed 32 along its upper rear surface is a top cover frame 33 which is of approximately the same surface area as the stationary bed. Similar to bed 32, the cover frame has a working area which is above the plane of its marginal rim 33.2. Forming a hood 34 above the bed and cover are side walls 35 and 36 and rear wall (not shown). A partial front wall 38 encloses the hood while allowing access to the interior of the bed and cover. Hood 34 funnels upwardly into an exhaust vent 39 provided with the usual exhaust blower (not shown). Along both sidewalls 35 and 36, exhaust ducts 41 and 42 each communicate with the interior of hood 34 and with the upper section of exhaust vent 39. Entrance to ducts 41 and 42 is accomplished by suitable openings such as opening 43 shown for duct 42. By means of this exhaust system, the atmosphere around the bed 32 and frame 33 is kept free of contaminating gases.

Extending across the rectangular working area of bed 32 is a lower diaphragm 45; and extending across the working area of cover frame 33 is an upper diaphragm 46. Both diaphragms may be made of rubber or other suitable flexible sheet material and each has an imperforate rectangular surface capable of covering the largest size sealed unit 10 which may be 22 inches by 69 inches. Virtually at the center of each diaphragm is a mesh screen inlet 47 in the lower diaphragm and 48 in the upper diaphragm. The respective inlets are arranged to be connected to a common tube system for the evacuation and test apparatus later discussed.

FIGS. 4 and 5 show the surface configuration of diaphragm sheets 45 and 46. In FIG. 4 is shown a highly magnified partial section of upper diaphragm 46 and the adjacent lamina 16 of laminated sheet 11a as these would be with the cover closed. Each diaphragm on its inner surface includes a multitude of tips 49 to provide a network of intercommunicating passages over the full area of the diaphragms. These tips may be formed by a large number of striations 50 criss-crossing with another set of striations 51. Other grooves or striations 52 are perpendicular to one another to complete the pattern. By these groove patterns, tips whose height is about .005 inch are formed. These grooves and tips are so minute that they may be sensed tactilely only by drawing the fingernail across them, and yet the intercommunicating passages will accommodate the flow of any leakage gas to the respective inlets 47 and 48.

As mentioned, cover 33 is hinged to bed 32 and the peripheral extremities of both structures fit together smoothly. Within the periphery of both bed 32 and cover 33 are imbedded similar gaskets 53 and 53.1 of resilient material such as rubber to form an air tight seal between the bed and cover with the cover in its closed position. This closed position is achieved by grasping extending handles 54 and drawing the cover down tightly until latching members 55 contact their mating counterparts (not shown) within air-actuated latches 56. These air-actuated latches may be of any of the generally known type used in machinery to firmly lock machine parts together. Also at each side of bed 32 is a mechanically actuatable limit switch 57 which energizes the latching apparatus and completes the electrical test circuit when cover 33 has reached its closed position.

A pipe 60 is connected to each of the screened inlet fittings 47 and 48 whereby during operation of the apparatus as presently described, the full area of the external wall surfaces of bag 10 is in communication with the pipes 60. A branch lead 61 is provided for the sensing element 62 of a thermocouple type vacuum gauge 63. This gauge is used principally to test the chamber for leaks as part of normal maintenance procedure.

By means of a T fitting, pipe 60 is commonly connected to the manifold 64 serving the test instrument system and the manifold 65 serving the chamber evacuation system. A valve 66 which may be manually operated, for its function is to isolate the test chamber from the manifolds for chamber leak testing, is open during the production operation of the test apparatus, whereby the inlet fittings 47 and 48 are in communication with the manifolds 64 and 65.

Communicating with the manifold 64, are a sensing element 67 for the thermocouple type vacuum gauge 68 electrically connected thereto, the sensing element 69 for the halogen leak detector 70 electrically connected thereto, and the vacuum pump 71. The detector 70 incorporates a milliammeter as its indicating device as is well known in the art. As indicated schematically in the control circuit diagram of FIG. 3a, the milliammeter is equipped to energize an audible and a visual "reject" signal upon movement of the pointer from its zero position to approximately 50% of its full scale, and is also equipped automatically to terminate the test by releasing the testing chamber latches, as later described. Also there is in communication with the manifold 64, a variable vent throttling type pressure control valve 73 in association with which is an air filter and purifier 74, which maintains a desired vacuum pressure within the manifold while preventing the introduction of contaminants such as halogen vapors, into the system.

The valving system for the instrument network comprises a quick acting solenoid valve 75 of the normally closed type, a normally closed, slow acting, motorized valve 76 and a manually operable valve 77 at the vacuum pump 71. For the purpose of purging any halogens which may be trapped or residual in the piping between the valves 75 and 76, bypass piping 78.1 is provided, communicating with the manifold 64 downstream of the halogen sensing element 69. Said bypass piping includes a control valve 78 which may be a normally open solenoid actuated valve.

Manifold 65 includes a solenoid operated, normally closed quick-acting valve 80, by means of which the piping 60 may be connected to the vacuum pump 81, and a solenoid operated valve 82 arranged for quick closing when energized, but having a slight delay in opening when its solenoid is deenergized. Valve 82 vents the piping 60 and the test chamber to atmosphere at the completion of a test, and is therefore equipped with the air filter and purifier 83 which, like the similar device 74, purges the incoming air of halogens and the like which might adversely influence the test results.

Pressure within manifold 65 is measurable by the thermocouple type vacuum gauge 84 and its indicating meter 85. Said meter 85 is electrically equipped to initiate the actuation of the instrument manifold valving system upon the attainment of the prescribed vacuum in the test chamber, as presently described. The vacuum pump 81 may be connected to or isolated from the manifold 65 through the manually operated valve 86.

The relatively complex valving and purifying system is required because of the extreme sensitivity and the delicacy of the halogen detector 69. A detector of the General Electric Company H4 type which is applicable for use herein, comprises a metal chamber within which there is a heated, positively charged, platinum emitter within a cylindrical collector electrode. The emitter operates at temperatures in a range of from 1300° F. to 1650° F. As is understood, the gas to be tested is introduced into the chamber and the presence of halogen vapor in the sensing element causes an increase in the flow of current between the emitter and the electrode. The current flow is indicated on the milliammeter 70. At the elevated temperatures at which the emitter operates, halogen vapors are broken down into very corrosive compounds which attack the platinum emitter and the other components of the testing device. Therefore, the detection device 69 is actually used under test conditions for relatively few seconds, that is to say of the order of only 15 seconds.

The automatic test procedure will be described with reference to the schematic wiring diagram of FIG. 3a. It will be assumed that switch 87 has been closed, and that the vacuum pumps 71 and 81 are in operation.

Preliminary to the test operation, the operator inspects the diaphragms 45 and 46 for dirt or other visible imperfections. The structures 32 and 33 are examined for defects which might interfere with their complete closing or otherwise preclude the establishment and maintenance of the necessary vacuum. The operator then visually inspects the outer layer of a unit 10 for obvious defects before placing it in the test chamber. The cover frame 33 is maintained in an open position by means of a suitable counterweight spring (not shown).

There are certain switching elements in FIG. 3a which exercise primary control over the testing system. It will be understood that whereas the various components of FIG. 3a are shown as though they handle full load across their contacts, this is for simplicity only and in the actual installation extensive use is made of relays and other heavy-duty circuit control devices. A switch 87 for operating the vacuum pumps is shown as independent of the test circuit. A main control test-circuit switch is indicated at 88. Said switch, together with the various indicators and signalling devices are advantageously located on the control panel, FIG. 1. A normally de-energized relay 89 has the illustrated contact bar bridging the fixed line contacts. A timer 90 has a cam 91 provided with a single drop-off point as shown; said cam is adapted to be rotated clockwise through one operational cycle in 15 seconds by the synchronous motor 92 operating through conventional gearing and slip clutch (not shown). The timer is of the well known type which is spring-biased to return to its "start" position whenever its motor is de-energized. The cam rider contact 93 is closed against contact 94 until the drop-off position is reached, whereupon it breaks with 94 and makes with a signalling contact 95 as later noted.

The control circuit includes a second timer 96 having a single cam 97 arranged to be rotated through a complete cycle in 60 seconds by the synchronous motor 98 operating through conventional gearing and slip clutch (not shown). As in timer 91, cam 97 has a single drop-off point and the timer is spring-biased to return to its start position when the motor is de-energized. Until the drop-off point is reached, the cam rider 100 maintains a closed circuit relationship with contacts 101 and 103 and an open circuit condition with contact 104; when the follower drops off the cam, the circuit through contact 104 is closed and the circuit to the other contacts is opened.

With switch 88 and relay 89 closed and the timer-operated circuits in their FIG. 3a position, no current flows to the control circuit until the cover responsive switches 57 are closed. These close when the operator manually closes the cover 33 against the bed plate structure, at which time the actuators 57.1 on the cover (FIG. 3) engage the switch plungers or actuators to complete the circuit. It is noted that with the switches 57 in series relation and disposed upon opposite sides of the cover, the cover must be squarely closed in order for a circuit to be completed across switches 57. This circuit condition accomplishes the following: By way of cam rider 100 and contact 101, timer motor 98 is energized to drive the cam 97 in clockwise rotation. By way of cam rider 100 and contact 103, solenoids 105 and 106 are energized to actuate the associated compressed air valves 107 and 108, which secure the cover latches 56. Also, solenoids 110 and 111 are energized; these respectively open valve 80 to connect piping 60 to manifold 65 and thus to the vacuum pump 81, and close valve 82 to seal the manifold 65 from the atmosphere.

Normally, it requires only about 15 seconds after the solenoids 110 and 111 are energized to evacuate the test chamber (as defined by the diaphragms 45 and 46 enveloping the bag 10) to the operating level of 800 microns. If, however, there is a leak in any of the system components sufficient to prevent the attainment of this vacuum condition within 60 seconds, the timer cam 97 will reach its drop-off point. Contact 103 will open, de-energizing the solenoids 110 and 111 to close manifold 65 relative to the pump 81, and venting the piping and test chamber to atmosphere. Air latch solenoids 105 and 106 are also de-energized, to de-actuate the latches 56 and permit the cover 33 to spring open. The switches 57 open when the cover is released whereupon all energy to the control system is interrupted. The timer motor is de-energized, whereupon the timer is returned to its start position as aforesaid. However, the closing of the contacts 101 and 104 had energized a slow release relay 112 which completes the energy circuit for the visual signal 114 and the audible signal 115 which collectively indicate the defective condition. The slow release of relay 112 continues the actuation of the signals for a sufficient time to insure that the operator will be in attendance.

During the operation of the apparatus, the vacuum pump 71 is maintaining the equivalent vacuum condition in the manifold 64, it being understood that the regulating valve 73 assists in this. The solenoid 113 in the bypass line is energized thus closing the bypass valve 78.

If the apparatus was in satisfactory condition, the desired vacuum condition would be attained in about 15 seconds after the cover 33 was closed. The indicator on vacuum gauge 85 would attain the desired reading, for example 800 microns, whereupon the indicator, represented by the contact 116 in FIG. 3a, closes with contacts 117 and 118. The circuit through contact 117 energizes the motor of the 15-second timer 90, whereupon its cam 91 begins its clockwise rotation. The circuit through contact 118 energizes the solenoid 120 which opens valve 75 and actuates the motor 121 which effects the slower opening of valve 76. As is well understood by those familiar with the use of halogen detectors, it is undesirable quickly to introduce the test gas into the halogen-sensitive device. The halogen-sensing device 69 is now connected to the piping 60. If within 15 seconds the manifold 64 does not contain more than a satisfactory amount of halogens, cam 91 will complete its cycle and will break the contact at 94 to interrupt power to the circuit. The test system manifold will be isolated from the test chamber, the test chamber vented to atmosphere, latches will be de-energized, the cover 33 will open all as previously noted, and the closing of contact 95 at timer 90 will illuminate the "satisfactory" signal lamp 122. This signal lamp may also be energized through a slow release relay but for simplification of the circuit, this arrangement has not been shown. On the other hand, if the presence of halogens in the manifold 64 is such as to indicate a leak in the bag 10 permitting the Freon content thereof to escape into the piping 60 and manifold 64, the pointer of the halogen indicator 70, represented by the movable contact 123 in FIG. 3a, will close against the contacts 124 and 125. The completion of the circuit through the contact 124 will energize the slow drop-out relay 126, completing the circuit to the "reject" lamp 127 and audible signal 128. Closing contact 125 will energize relay 89 to interrupt power to the system, whereupon the manifold valves will be operated as aforesaid, the latches will release the cover, etc. The delay in relay 126 maintains the signals 127 and 128 active to insure the attention of the operator.

Obviously, whenever the electrical system is deenergized, the release of solenoid 113 causes the bypass valve 78 to open, thus purging the piping between the valve 75 and 76 of any residual halogens. It will be evident that in view of the fact that valves 75 and 76 close under any circumstance which opens the main power supply to the testing circuit, it would be possible for some residual halogen to be trapped therebetween. If it were not for the purging of this piping by means of the bypass valve, the very next operation of the apparatus would falsely indicate a leak in the bag under test.

As is well known, a pressure of only 800 microns is representative of a very high vacuum. The Freon within the bag 10 is at nearly atmospheric pressure, whereupon if it were not for the close envelopment of the bag 10 by the diaphragms 45 and 46 and the support given thereby to the walls of the bag, the bag would rupture. The diaphragms have the further advantage of reducing the effective volume of the test chamber to greatly shorten the time required for evacuating the chamber and the manifold.

It will be understood that although the automatic operation of the apparatus has been described, the various valves and the like may be actuated by manual operation.

While there has been described what is at present considered to be the preferred embodiment of the invention, it will be understood that various modifications may be made therein, and it is intended to cover in the appended claims, all such modifications as fall within the true spirit and scope of the invention.

What is claimed is:

1. In a device for testing for gas leakage from a gas-filled, flexible walled structure, an evacuable resilient chamber adapted to envelop a structure to be tested, means for evacuating said chamber whereby said chamber closely conforms to the surface contours of said structure to support the walls of said structure, a plurality of minute striations on the inner surface of chamber to allow passage and dispersion throughout said chamber of any gas leaked thereinto from said structure in test, gas-detecting means in communication with said chamber, means for activating said detecting means to scan said chamber for leaked gas, and means to signal the presence of leaked gas in said chamber.

2. In a device for testing for gas leakage from a gas filled, sealed, flexible walled structure; a rigid outer frame, an evacuable resilient inner chamber within said frame and adapted to envelop therein a structure to be tested, means for evacuating said chamber to a desired vacuum level whereby said chamber closely conforms to the surface contours of said structure, a plurality of minute striations on the inner surface of said chamber to allow passage and dispersion throughout said chamber of gas leaked from said structure in test at said vacuum level, gas detecting means, means operative on evacuation of said chamber to said predetermined level for activating said gas detecting means to scan said inner chamber for leaked gas, indicating means responsive to said detecting means having detected leaked gas in said inner chamber for providing an indication thereof.

3. In a device for testing for leakage from a gas-filled, sealed flexible walled bag; a rigid outer frame defining a chamber communicating with the ambient atmosphere, an evacuable inner chamber within said frame and comprising a pair of resilient rubber diaphragms adapted to envelop therebetween a bag to be tested, means for evacuating said inner chamber to a predetermined vacuum level whereby said diaphragms closely conform to the surface contours of said bag to thereby support said bag walls against the pressure differential developed by said evacuation, a plurality of minute striations on the inner surface of diaphragms to allow passage and dispersion throughout said inner chamber of gas leaked by said bag in test at said predetermined vacuum level, a gas detector in communication with said inner chamber, and means for activating said gas detector to scan said inner chamber for leaked gas.

4. A device as claimed in claim 3, further including means effective after a predetermined interval during which the amount of leaked gas within said evacuated inner chamber is below a predetermined minimum to actuate a signal indicating such condition, and means responsive to the actuation of such signal to admit atmospheric air into said inner chamber.

5. In a device for testing for leakage from a gas-filled, sealed, flexible walled bag, a rigid outer chamber open to the ambient atmosphere, an evacuable resilient inner chamber adapted to retain therein a bag to be tested, means for evacuating said inner chamber to a predetermined partial vacuum pressure whereby said inner chamber closely conforms to the surface contours of said bag, said inner chamber thereupon reinforcing said bag walls from the differential between said outer chamber pressure and said partial vacuum pressure, a plurality of minute striations on the inner surface of inner chamber to allow passage and dispersion throughout said evacuated inner chamber of gas leaked from said bag into said inner chamber, sensing means operable at said partial vacuum pressure to sense gas with which said bag has been filled, means for activating said sensing means to scan said inner chamber for the presence of leaked gas, and means responsive to the presence of gas in said inner chamber for actuating a leak signal.

6. An apparatus for individually leak testing a succession of gas-filled, flexible walled bags, of which succession each may have different overall dimensions, said apparatus comprising an upper and lower readily deformable diaphragm, said diaprhagms each having a larger surface area than the largest bag to be tested, said diaphragms combinedly forming an envelope about the bag being tested, means for evacuating said envelope to a predetermined partial vacuum level to cause said envelope to collapse and closely conform to the shape of the bag being tested, said diaphragms thereby reinforcing the walls of the bag being tested, a plurality of intercommunicating channels enchased into the inner surface of each of said diaphragms to expedite gas dispersion through said envelope with said envelope evacuated, means for detecting the presence of gas in said channels with said envelope evacuated to said predetermined vacuum level, and means responsive to the detection of gas in said channels for operating a leak signal.

7. Apparatus for individually leak testing each of a succession of gas-filled, flexible walled bags of which succession each bag may have a different surface area; said apparatus comprising a frame, means within said frame to provide a gas-impervious collapsible envelope to receive a bag to be tested, means for evacuating said envelope to a predetermined subatmospheric pressure to cause said envelope to closely conform to the shape of the adjacent bag sidewalls and thereby reinforce said bag walls, a plurality of intersecting channels formed in the inner surface of each of said sheets to allow ready dispersion of gas from a bag in test throughout said envelope when said envelope is evacuated, means for sensing the presence of leaked gas in said evacuated envelope and means responsive to gas sensed in said evacuated envelope for operating an alarm signal.

8. An apparatus for individually leak testing each of a succession of gas-filled, flexible walled bags, said apparatus comprising a pair of readily deformable, gas-impervious rubber sheets, a frame structure positioning said sheets in parallel relationship with a bag to be tested therebetween, said frame structure providing a chamber within which said sheets combinedly form an envelope about the bag being tested, means for closing said chamber to tightly seal said envelope therein, means for evacuating said envelope to a predetermined partial vacuum pressure to cause said envelope to shape itself to the contours of said bag and thereby reinforce said bag walls against the pressure differential between said chamber and said envelope, a pattern of intercommunicating channels formed in the surface of each of said sheets adjacent the bag therebetween to allow immediate gas dispersion throughout said evacuated envelope when said envelope is evacuated, means for detecting the presence of leaked gas in said evacuated envelope and means responsive to gas detected in said evacuated envelope for operating an alarm signal.

9. An apparatus as claimed in claim 8 further comprising means responsive to said detecting means finding less than a predetermined amount of leaked gas in said evacuated envelope for actuating a signal, and means responsive to the actuation of said last mentioned signal for admitting atmospheric air into said envelope for the removal of the bag therefrom.

10. In a device for testing for leakage from a gas-filled, sealed, flexible-walled, pillow-shaped structure: a support frame comprising a stationary bed, said stationary bed having a surface area greater than that of the largest structure to be tested, a resilient gas impervious sheet member mounted across said bed to retain therein a structure to be tested, a cover hingedly mounted on said bed and having a surface area substantially equal to that of the bed, a second resilient gas impervious sheet member mounted across the surface area of said cover, means for closing said cover over said bed to thereby form a resilient envelope of said sheet members about said structure to be tested, means for evacuating said envelope to a predetermined vacuum level, said envelope on evacuation collapsing to shape itself to the contours of said pillow-shaped structure, a net work of interconnected striations in the surface of each of said sheets adjacent said structure to allow dispersion of gas through said network, a gas sensor in communication with said envelope, means responsive to said vacuum pressure having been reached in said envelope for initiating the operation of said gas sensor to scan said envelope for gas leaked from the bag in test, and alarm signal means responsive to the presence of leaked gas in said envelope as detected by the scanning of said sensor to indicate said leakage.

11. In a device for testing for gas leakage from a gas-filled, sealed, flexible walled, pillow-shaped structure: a supporting frame comprising a stationary bed, said stationary bed having a surface sectional area greater than that of the largest structure to be tested, a resilient gas-impervious sheet member stretched across said surface to retain therein a bag to be tested, a cover pivotally disposed to said bed and having a surface sectional area substantially equal to that of the bed, a second resilient gas-impervious sheet member mounted across the surface area of said cover, means for closing said cover over said bed to thereby form an outer chamber open to atmospheric pressure, said sheet members thereby forming a resilient evacuable envelope about the structure to be tested, means for evacuating said envelope to a predetermined vacuum level, the surface of each of said sheets adjacent said structure being pebbled to provide a multiplicity of interconnecting passages for the dispersion of gas between said structural walls and the respective sheets, a gas detecting sensor in communication with the said interconnecting passages of each of said sheets, means responsive to said vacuum level having been reached in said envelope for initiating the operation of said gas sensor to test said envelope for gas leaked from said structure, and alarm signal means actuated by said sensor upon the attainment thereof of a condition indicative of a predetermined leaked gas condition within said chamber.

12. In a device for testing for gas leakage from a halogen gas filled, sealed, flexible-walled, pillow-shaped structure: a support frame comprising a stationary bed, said stationary bed having a surface sectional area greater than that of the largest structure to be tested, a first rubber sheet member mounted across said surface section area to accommodate a bag to be tested, a cover hinged to said bed and having a surface sectional area substantially equal to that of the bed, a second rubber sheet mounted across the surface area of said cover, whereby a bag to be tested may be positioned between and wholly within the confines of said rubber sheets, means for latching said cover in a closed position with respect to said bed to thereby form about said bag a resilient, gas impervious envelope of said rubber sheet members, means for evacuating said envelope to a desired sub-atmospheric pressure, said envelope on evacuation collapsing to shape itself to the contours of said pillow-shaped structure, a network of interconnected striations in the surface of each of said sheets adjacent said structure to allow dispersion of gas through said network, a halogen gas-detecting sensor in communication with the space between said sheets and said bag, means responsive to the attainment of said pressure condition in said envelope for initiating the operation of said sensor, alarm signal means responsive to the detection by said sensor of a predetermined quantity of halogen gas in said envelope for indicating the presence of said gas, and means effective following a predetermined interval during which said sensor indicates the presence of less than said predetermined quantity of gas to actuate a second signal.

13. In a device as claimed in claim 12, means responsive to an indication by said second signal means for releasing said cover latching means.

<center>No references cited.</center>